(12) United States Patent
Mukasa et al.

(10) Patent No.: US 12,328,325 B1
(45) Date of Patent: Jun. 10, 2025

(54) PROBABILISTIC EVENT LINKING

(71) Applicant: CrowdStrike, Inc., Sunnyvale, CA (US)

(72) Inventors: Sseziwa Mukasa, Salem, MA (US); Daniel Brown, Ipswich, MA (US)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 18/963,186

(22) Filed: Nov. 27, 2024

Related U.S. Application Data (60) Provisional application No. 63/677,103, filed on Jul. 30, 2024.

(51) Int. Cl.
    *H04L 9/40*     (2022.01)

(52) U.S. Cl.
    CPC ................ *H04L 63/1416* (2013.01)

(58) Field of Classification Search
    CPC .................................................... H04L 63/1416
    USPC ............................................................. 726/23
    See application file for complete search history.

(56) References Cited

U.S. PATENT DOCUMENTS

| | | | | |
|---|---|---|---|---|
| 9,210,183 | B2 * | 12/2015 | Sadovsky | H04L 63/1408 |
| 2002/0078381 | A1 * | 6/2002 | Farley | H04L 43/00 |
| | | | | 726/23 |
| 2002/0082886 | A1 * | 6/2002 | Manganaris | G06F 21/552 |
| | | | | 719/318 |
| 2008/0271143 | A1 * | 10/2008 | Stephens | H04L 63/1425 |
| | | | | 726/22 |
| 2016/0021128 | A1 * | 1/2016 | Kloth | H04L 63/1416 |
| | | | | 726/23 |
| 2016/0381066 | A1 * | 12/2016 | Galula | H04L 63/1441 |
| | | | | 726/23 |
| 2018/0322276 | A1 * | 11/2018 | Brown | H04L 63/1433 |
| 2021/0049477 | A1 * | 2/2021 | Sakae | G06N 20/20 |
| 2021/0073097 | A1 * | 3/2021 | Upadhyay | G06F 11/0757 |
| 2023/0308459 | A1 * | 9/2023 | Crabtree | H04L 63/1416 |
| 2023/0308460 | A1 * | 9/2023 | Thomas | H04L 63/102 |

FOREIGN PATENT DOCUMENTS

| | | |
|---|---|---|
| CN | 106970832 A | 7/2017 |
| CN | 116318751 A | 6/2023 |

* cited by examiner

*Primary Examiner* — Badri Champakesan
(74) *Attorney, Agent, or Firm* — Womble Bond Dickinson (US) LLP (57) ABSTRACT

A method of monitoring a network for linked events includes receiving an indication of an occurrence of a first event in a computing environment, calculating a first estimated rate of occurrence of the first event based on a first cache associated with the first event, and identifying an occurrence of a second event within a threshold amount of time prior to the occurrence of the first event. The method further includes calculating a second estimated rate of occurrence of the second event based on a second cache associated with the second event and determining, based on the first estimated rate of occurrence of the first event and the second estimated rate of occurrence of the second event, whether the occurrence of the first event and the occurrence of the second event have a common cause.

14 Claims, 7 Drawing Sheets

PROBABILISTIC EVENT LINKING

RELATED APPLICATIONS

This application claims benefit of provisional U.S. Patent Application No. 63/677,103 filed on Jul. 30, 2024, which is herein incorporated by reference in its entirety.

TECHNICAL FIELD

Aspects of the present disclosure relate to detecting malicious behavior of a computer system or network, and more particularly, to probabilistic linking of detected events for identification of anomalous behavior.

BACKGROUND

Malicious behavior in a computing environment includes cyber activity that is intended to compromise the confidentiality, integrity, or availability of computers, networks, and information systems. Malicious behavior is generally anomalous and thus is associated with events that do not typically occur within a computing environment. Malicious activity can occur at various levels in a computing system, such as at an endpoint, across a network, across an entire corporate system, etc. Anomalous behavior is, therefore, context specific and depends on the identification of anomalous events occurring at the various levels or scopes within a computing environment.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As discussed above, malicious behavior in a computing environment is assumed to be anomalous (e.g., atypical occurrences) and is therefore unlike typical behavior observed in the computing environment. Anomalous behavior, however, should be determined both in the context of an endpoint and larger scope, such as network level or corporate system level. Accordingly, when potentially malicious events occur frequently for a subset of endpoints in scope it may be necessary to determine whether a potentially malicious behavior is likely to be due to the same cause or causes driving the commonly observed occurrences or is due to a different, more anomalous, cause.

Conventional systems may collect a large volume of event history to identify typical behavior (e.g., over several weeks, months, years, etc.). The collection of large volumes of event history, however, is resource intensive in the amount of data that must be stored and may be unreliable due to statistical methods that assume the underlying distribution of behavior was stable over the time in which the historical data was collected (e.g., assumes typical behavior is consistent or the same over time). Additionally, conventional systems may not identify anomalous behavior early on in the deployment of the system because a large amount of historical data is necessary before the system can determine typical behavior in the environment.

The present disclosure addresses the above-noted and other deficiencies by providing a fixed size cache of occurrences for an event for determination of an estimated rate of occurrence of the event and determining a probability of related events based on the likelihood of cooccurrence of the events determined from the estimated rates of occurrence of each event. As discussed herein, the cache, or fixed size cache, may be cache memory, CPU cache, disk cache, browser cache, memory cache, database cache, application cache, other temporary storage areas, or a combination thereof. When a new occurrence of an event is identified, the rate of occurrence of the event is determined using the corresponding cache storing previous occurrences of the event. For example, the rate of occurrence of an event may be determined by averaging the lapsed time between events. In other examples, the rate of occurrence of an event may be determined by a weighed average in which more recent events are given a larger weight.

The rates of occurrence of the different events may be used to determine whether different event occurrences in the computing environment that happen relatively close in time are related (e.g., have the same underlying cause). For example, an event that occurs often within the computing environment may have a high likelihood of cooccurring with other event occurrences that are less probable. Thus, events that have a likelihood of cooccurrence that exceeds a threshold may be filtered out as non-malicious or non-related to the other less frequent events. Once the events with high probabilities of cooccurrence are filtered out, the probabilities of the cooccurrence of the remaining events can be calculated. For example, the probabilities of cooccurrence may be determined based on the frequency (e.g., rates of occurrence) for each event and the time interval between the occurrence of the event. In particular, event occurrences that happen closer in time to one another are more likely to be related, and events with lower frequency are more likely to be related.

In some embodiments, multiple levels or scopes of anomalous activity may be determined to identify related events. In some embodiments, a first level of anomalous activity may include a finer grained determination of anomalous activity, such as at the endpoint level or user level. This level is referred to herein as the entity level. In some embodiments, determining anomalous behavior at the entity level may include identifying events that occur at a rate that is above a typical rate for the event. For example, if an estimated or typical rate of occurrence of a particular event associated with an entity (e.g., endpoint, user, etc.) is six hours, then if that event occurs at interval of three hours, then that event may be signaled as anomalous with respect to that entity. Once an event is signaled as anomalous at the entity level, the event occurrence may be provided to a second less granular level for determination of anomalous behavior within the less granular context (e.g., at the network level, company level, etc.) Events from various first level source may be compared at the second level to determine whether the behavior identified at the first level is also anomalous at the first level and whether those events are related to other events that have occurred within the second level context (e.g., the entire network).

Probabilistic linking may be applied at the second level to determine whether different events are related (e.g., have the same underlying cause). In particular, the same or similar event occurrence across the second level context may be aggregated together into a fixed size cache (e.g., the latest N number of occurrences of an event may be stored in a cache for that event). Similar to the first level, the rates of occurrences for each event may be determined from the occurrences stored in cache for that event at the second level. Additionally, the determination of the probability of cooccurrence may be calculated at the second level, as discussed above.

As discussed herein, the present disclosure provides for reduced computing resource requirements due to a fixed size cache for storing event occurrences and for calculating estimated event occurrence rates. Additionally, using the probability of cooccurrence of events more accurately and reliably filters unrelated, and less anomalous, event occurrences from detections due to increased probability of anomalous behavior from unlikely cooccurrences.

Figure 1:
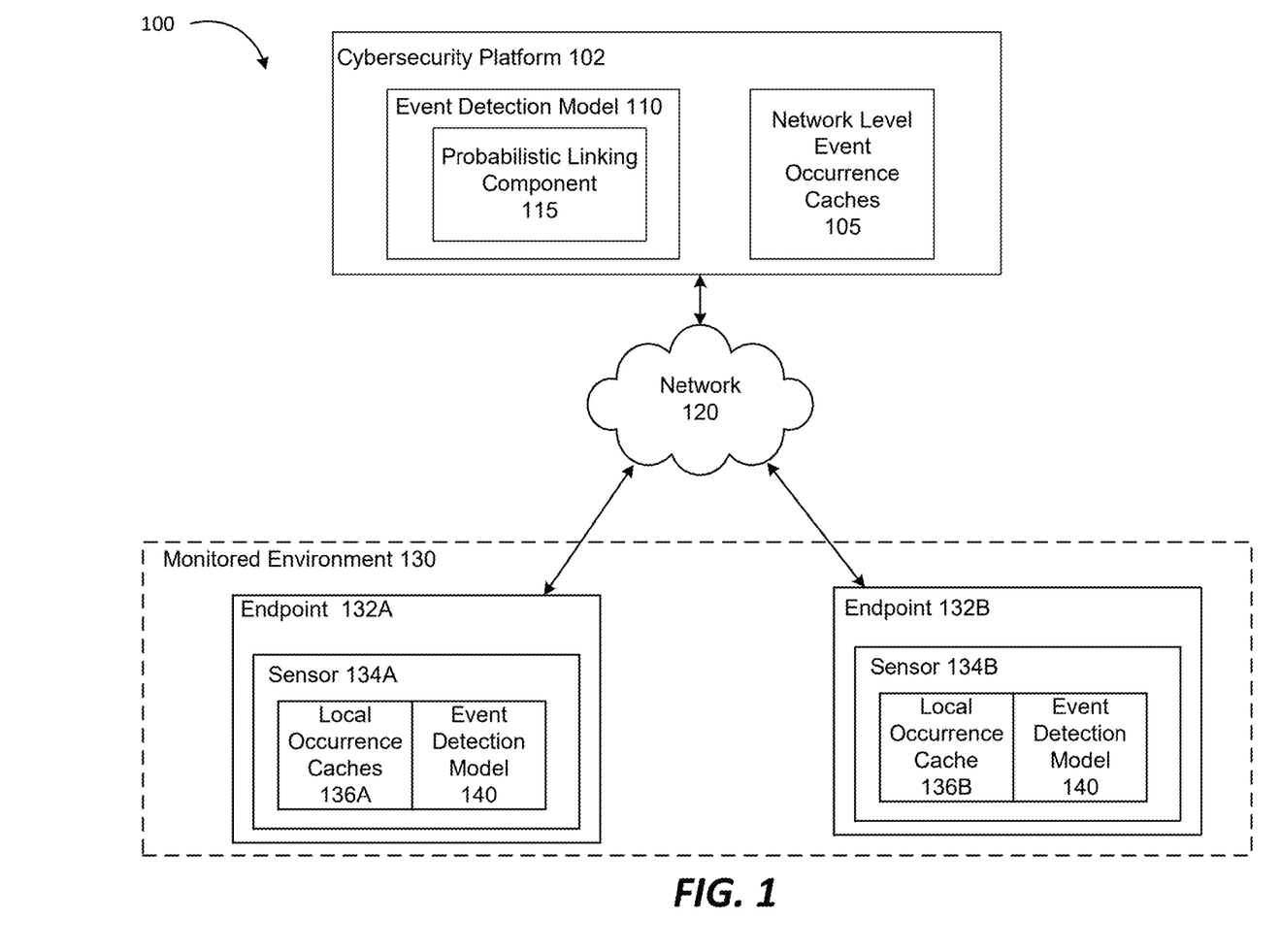
FIG. 1 is a block diagram illustrating an example cybersecurity system architecture, in accordance with some embodiments of the present disclosure.

FIG. 1 is a block diagram illustrating a computing system architecture 100 in which embodiments of the present invention may operate. Computing system architecture 100 may include a cybersecurity cloud platform 102 coupled to endpoints 132A-B of a monitored environment 130 by a network 120. Monitored environment 130 may be a local network, a corporate network, a set of devices, a user domain, or any other collection or set of computing resources. Endpoint devices 132A-B may be . . . . In some embodiments, endpoints 132A-B may be users, devices, or any other entity coupled to or operating within the monitored environment 130.

In some embodiments, a sensor 134A-B may execute at each endpoint 132A-B and may monitor the corresponding endpoint 132A-B for potentially malicious event occurrences. For example, sensor 134A may monitor endpoint 132A for identifiers that may be associated with malicious activity. In some embodiments, the sensors 134A-B may each operate to detect occurrences of indicators of attach (IOA) that, with varying probability, may be associated with malicious activity. For example, the sensors 134A-B may detect when a new IP address communicates with the corresponding endpoint 134A or 134B. Many different indicators may be defined for detection by the sensors 134A-B, for example, by event detection model 140. Upon detection of an indicator (e.g., IOC), the sensor may log the occurrence as a detection event (e.g., a signal of detection). Each detection may be associated with a likelihood or probability that the detection is malicious. For example, some IOCs may be inherently more likely to indicate malicious activity. The event detection model 140 may therefore assign an initial probability that the detection event is malicious. Each detection may also be stored in a local occurrences cache (e.g., an individual cache of local occurrence caches 136A-B). Furthermore, the sensors 132A-B may also provide each detection event that satisfies a minimum probability of malicious activity to the cybersecurity platform 102 for further analysis.

The cybersecurity platform 102 may execute an additional event detection model 110 that operates to determine if detection events occurring across the monitored environment 130 are indicative of malicious activity. The event detection model 110 of the cybersecurity platform 102 may include a probabilistic linking component 115 to determine if event occurrences across the monitored environment 130 are related or otherwise correlated such that the events are likely to be associated with a common cause (e.g., a malicious actor or related non-malicious activity). As a note, while the cybersecurity platform 102 may operate to detect malicious activity, identifying related non-malicious activity may assist to remove atypical but non-malicious events from further scrutiny and allow resources to be more efficiently directed to review events that are more likely to be malicious.

As noted above, the detected events from the endpoints 132A-B that meet a minimum probability of malicious activity are provided to the cybersecurity platform 102. The cybersecurity platform may store occurrences a particular type of detection in an event occurrences cache (e.g., of the event occurrence caches 105) for that type of event. Each event occurrence cache may store a fixed number of event occurrences along with information such as a timestamp, probability, etc. To identify correlated events, upon receiving a new detection event from one of the endpoints 132A-B, the probabilistic linking component determines a frequency of occurrence (also referred to herein as rate of occurrence) for the event based on the timestamps of each event occurrence stored in the corresponding cache. For example, if the fixed size cache for a first type of event is four and a newly received event is identified as the first type of event, the probabilistic linking component 115 may calculate, from the timestamp for the newly received event and the four previously cached events, an estimated rate of occurrence for the first type of event. The probabilistic linking component 115 may then determine if any other events occurred nearby in time to the newly received event (e.g., within a threshold amount of time prior to the newly received event occurrence). If an event, or more than one event, is identified then the rate of occurrence of the detected event or events is determined from the corresponding caches for those detected events.

Once the occurrence rates for each of the events that have cooccurred (e.g., occurred within a threshold amount of time from one another) are determined, the probabilistic linking component 115 may determine, based on each event occurrence rate and the proximity in time of the different events, if it is likely that they are correlated. For example, if two events occur at a nearby time but either one or both of the event types occur at a high frequency, then it is unlikely that this is anomalous behavior. However, if both event types occur rarely (e.g., at a low frequency) then the likelihood of them cooccurring is very low, thus it is very probable that they are related in some way or associated with the same cause (e.g., the same malicious attack or some atypical but non-malicious activity such as a system update or the like). Accordingly, based on the occurrence rates of the various detection event types, the probabilistic linking component 115 may identify correlated events across the monitored environment 130 with high accuracy.

Figure 2:
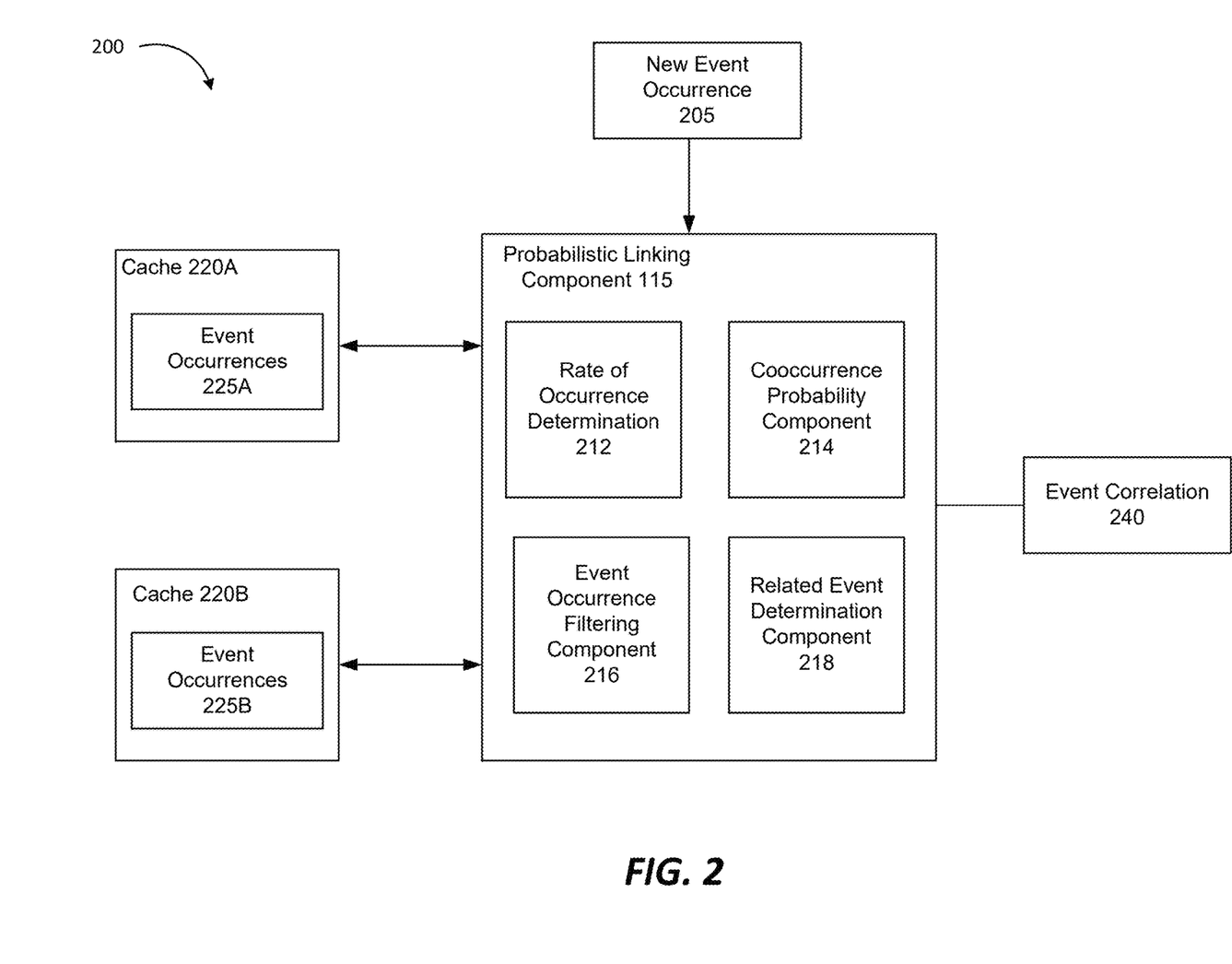
FIG. 2 is a block diagram that illustrates an example system for probabilistic linking of event occurrences in a computing environment, in accordance with some embodiments of the present disclosure.

FIG. 2 is a block diagram that illustrates an example system 200 for performing probabilistic linking of correlated detection events in a computing environment, according to some embodiments. System 200 includes a probabilistic linking component 115, which may the same or similar as probabilistic linking component 115 of FIG. 1. System 20 may further include one or more caches 220A-B to store event occurrences 225A-B for a particular event or event type. For example, cache 220A may store event occurrences 225A that may include detection events of a first IOC while cache 220B may store event occurrences 225B that may include detection events for a second IOC. Embodiments may include any number of different fixed size caches (e.g., one for each of the events that are defined and could potentially be detected by a sensor of an endpoint). The probabilistic linking component 115 may receive and identify a new event occurrence 205 (e.g., from an endpoint sensor) and identify the event or type of event that the occurrence is associated with. Accordingly, the probabilistic linking component 115 may identify which cache that the new event is associated with.

The probabilistic linking component 115 may further include a rate of occurrence determination component 212, a cooccurrence probability component 214, an event occurrence filtering component 216, and a related event determination component 218. In some embodiments, the rate of occurrence determination component 212 may determine, based on the event occurrence in the cache identified for the new event occurrence, an estimated rate of occurrence of the event. For example, if the new event occurrence 205 is associated with cache 220A, the rate of occurrence determination component 212 may determine the estimated rate of occurrence based on the event occurrences 225A in the cache 220A. For example, the rate of occurrence determination component 212 may calculate an average interval between the event occurrences 225A and thus, calculate an estimated frequency of the occurrences 225A. In some examples, the rate of occurrence determination component 212 may calculate the estimate rate of occurrence based on the event occurrences 225A in the cache as well as the new event occurrence 205 timestamp. Additionally, the rate of occurrence determination component 212 may determine the rate of occurrence of another event which has an occurrence relatively close in time with the new event occurrence (e.g., within a threshold time prior to the new event occurrence 205). For example, a prior event occurrence may be associated with the event stored at cache 220B. Accordingly, the rate of occurrence determination component 212 may determine the rate of occurrence for this other event occurrence based on the event occurrences 225B stored in cache 220B.

The cooccurrence probability component 214 may then determine a probability that the different events occurred near in time to one another (e.g., the probability of cooccurrence of the events). In some examples, the cooccurrence probability component 214 may calculate the probability of cooccurrence based on the estimate rates of occurrence for each of the events. In addition, the probability of cooccurrence may further be calculated based on the proximity in time of the different events (e.g., the closer in time is a less likely). The event occurrence filtering component 216 may then filter out any events in proximity to the new event occurrence that were above a maximum threshold of probability of cooccurrence (e.g., it was not unlikely that the events occurred close in time). Thus, only events that were unlikely to cooccur are provided to the related event determination component 218. The related event determination component 218 may then determine, based on the probability of cooccurrence, whether the events are likely to be related to the same underlying cause and that there is an event correlation 240.

Figure 3A:
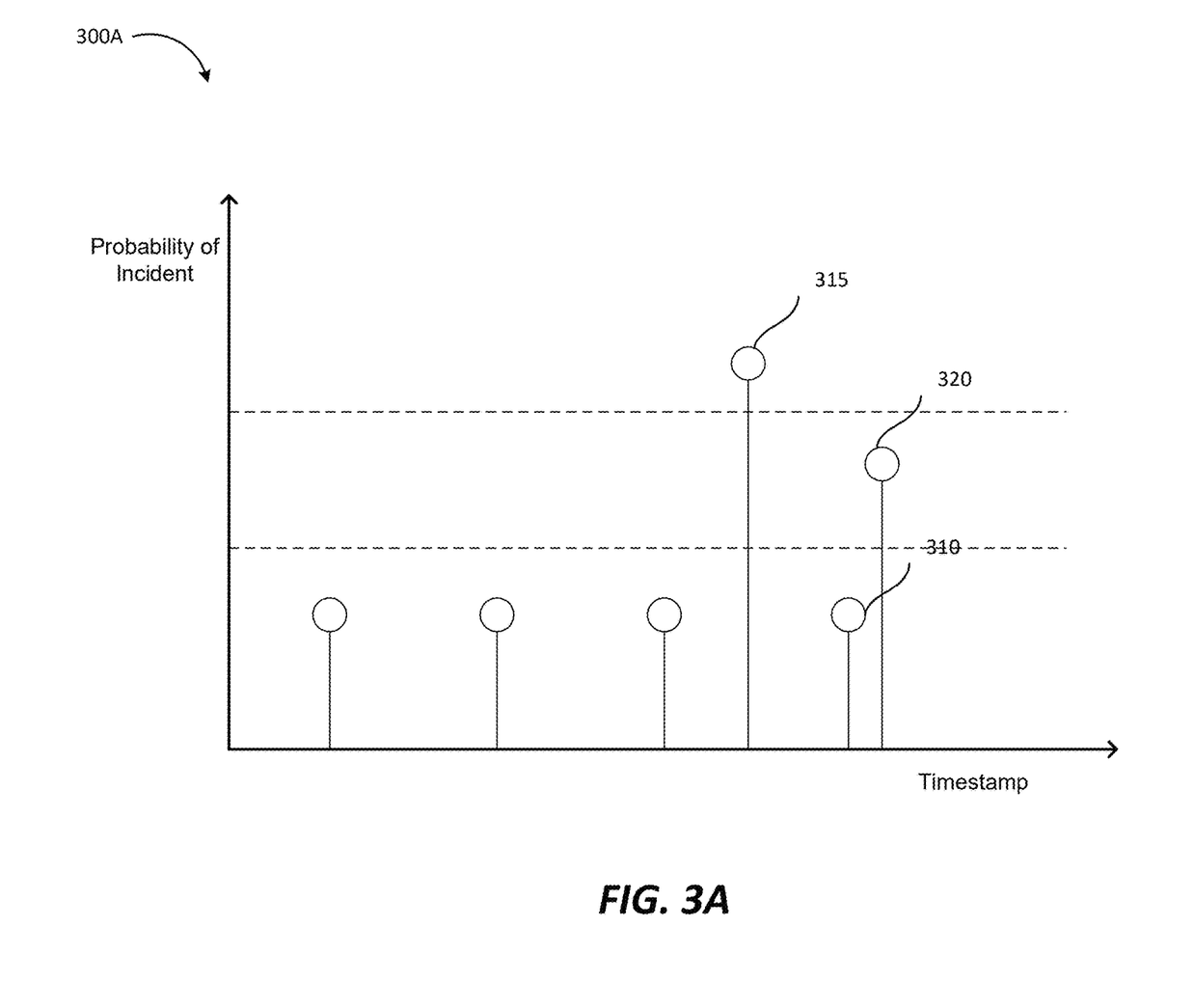
FIG. 3A is an event occurrence diagram illustrating an example set of event occurrences with various likelihoods and occurrence rates, in accordance with embodiments of the present disclosure.
Figure 3B:
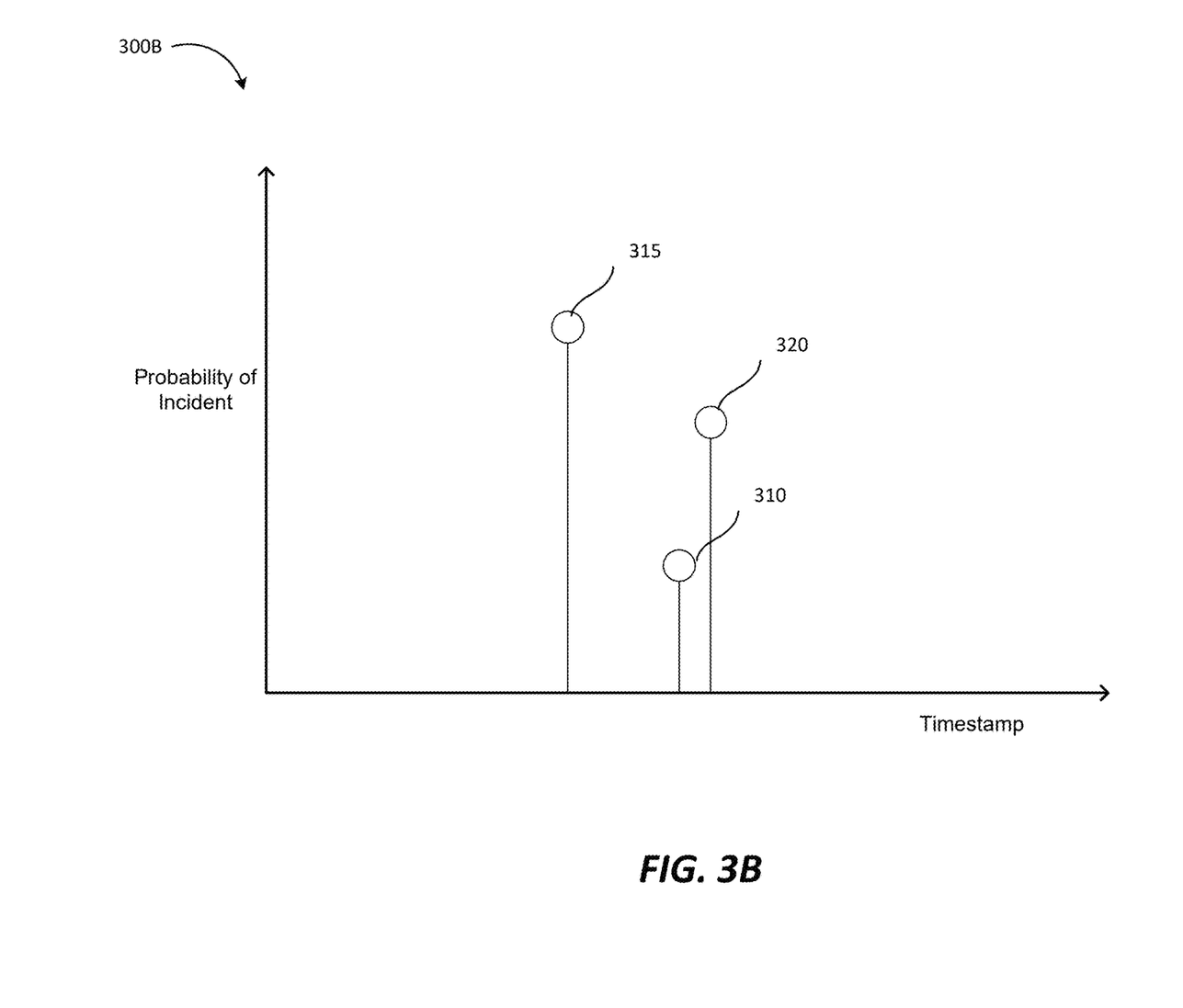
FIG. 3B is an event occurrence diagram illustrating an example set of event occurrences after filtering out common events and events that are unlikely to be correlated, in accordance with embodiments of the present disclosure.

FIG. 3A is an event occurrence diagram 300 illustrating an example set of event occurrences with various likelihoods and occurrence rates, in accordance with embodiments of the present disclosure. As depicted in FIG. 3A, events may occur at various rates within a monitored system. Some events, such as events 310 may occur frequently but may be of low probability of malicious activity. Other events, such as events 315 and 320 (the most recent new event occurrence) may occur less frequently but may be of higher probability of malicious activity. Because event 310 occurs relatively often, based on the most recent events in the corresponding event cache, it is likely to overlap or cooccur with other events and thus the cooccurrence may not indicate any related underlying cause. Thus, as depicted in FIG. 3B, event 310 occurrences can be filtered out with regards to probabilistic linking and grouping. Event 315, however, has a low occurrence rate, similar to new event 320, and therefore indicates a potential correlation or underlying cause of the occurrence of events 315 and 320. To determine whether the cooccurrence is sufficiently unlikely, and thus is anomalousness, embodiments may calculate the probability of cooccurrence based on the rate of occurrence of event 315 and 320 (e.g., based on the previous occurrence of events 315 and 320 stored in a corresponding fixed size cache) and the proximity, in time, of the events. As can be seen in FIG. 3A, while events 315 and 320 occur further apart in time than event 320 and the most recent event 310, the lower rate of occurrence of 315 makes the cooccurrence more unlikely and thus, have a higher probability of correlation.

Figure 4:
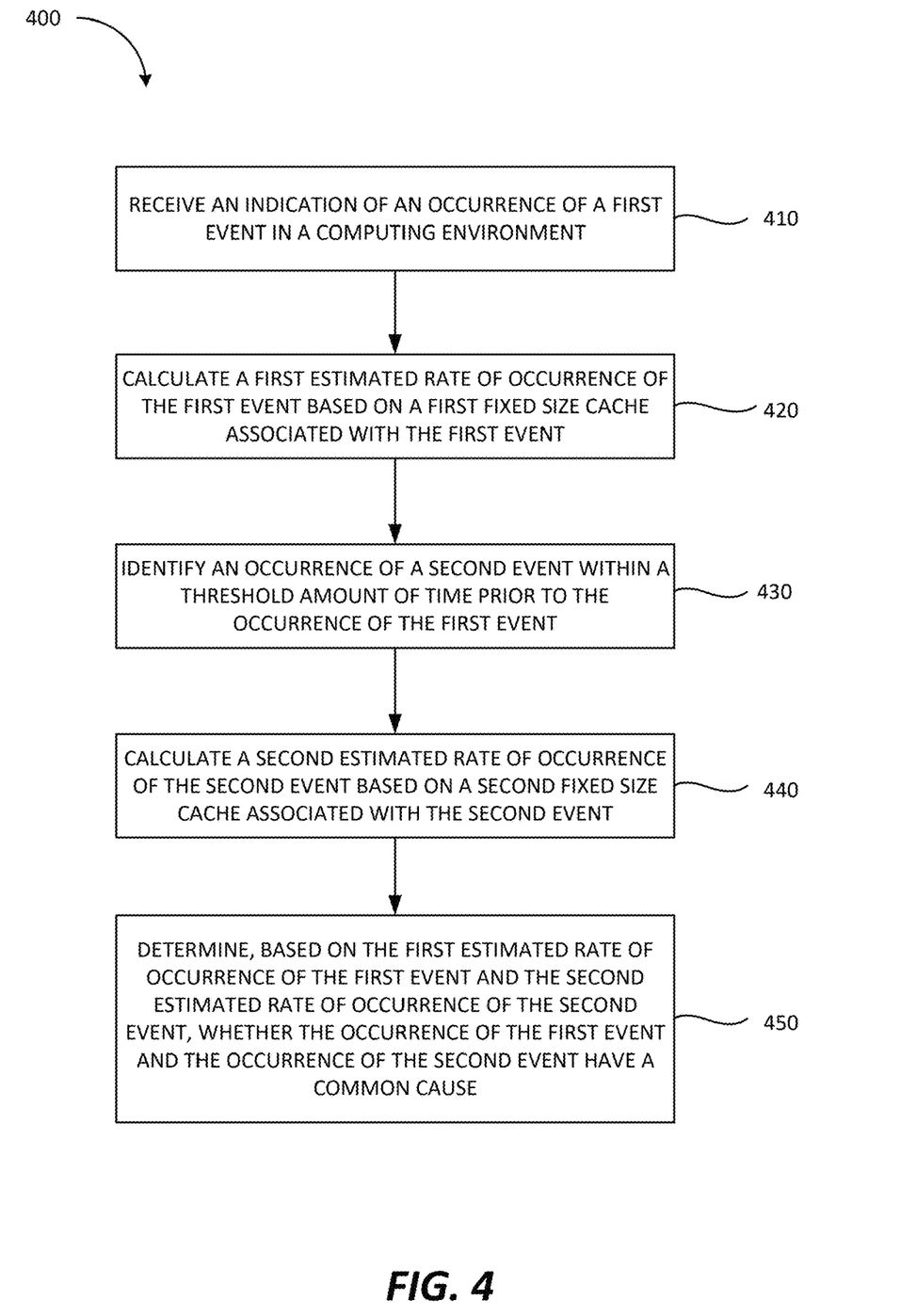
FIG. 4 is a flow diagram of an example method of probabilistic linking of event occurrences, in accordance with some embodiments of the present disclosure.

FIG. 4 is a flow diagram of a method 400 of probabilistic linking of event occurrences, in accordance with some embodiments of the present disclosure. Method 400 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by cybersecurity cloud platform 102, sensors 134A-B, or probabilistic linking component 115 of FIGS. 1-2.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

With reference to FIG. 4, method 400 begins at block 410, where processing logic receives an indication of an occurrence of a first event in a computing environment. For example, a sensor deployed to a device within a network may detect the occurrence of the event and provide an indication of the occurrence to a network monitoring system. The network monitoring system may collect or receive event occurrences from various devices on the network. Accordingly, embodiments may detect events that have a common cause whether they occur at the same device or on separate devices of the same network.

At block 420, processing logic calculates a first estimated rate of occurrence of the first event based on a first cache associated with the first event. In some embodiments, calculating the first estimated rate of occurrence includes calculating a weighted average of the time between occurrences of the first event stored in the first cache. In other embodiments, calculating the first estimated rate of occurrence may include calculating a normal average of the time between occurrences in the first cache. Additionally, any other calculation may be performed to quantify an occurrence rate of the occurrences of the first event stored in the first cache.

At block 430, processing logic identifies an occurrence of a second event within a threshold amount of time prior to the occurrence of the first event. While the second event is depicted as occurring after the first event, it should be noted that the second event may occur before or after the first event (e.g., the order of occurrence does not change the operation of embodiments described herein). In some embodiments, the threshold amount of time is determined based on the first estimated rate of occurrence of the first event. For example, a larger threshold amount of time, otherwise referred to as a lookback, may be determine when the occurrence rate of the first event is low and a smaller threshold amount of time may be determined when the occurrence rate of the first event is high. In other words, the threshold amount of time differs based on the probability of the occurrence of the first event. Thus, the lower the probability of the first event, the larger the threshold window because the probability of cooccurrence with other events is lower.

At block 440, processing logic calculates a second estimated rate of occurrence of the second event based on a second cache associated with the second event. In some embodiments, the first cache includes a first fixed size to store a fixed number of occurrences of the first event and the second cache includes a second fixed size to store a fixed number of occurrences of the second event. In some embodiments, calculating the first estimated rate of occurrence includes calculating a weighted average of the time between occurrences of the second event stored in the second cache. In other embodiments, calculating the first estimated rate of occurrence may include calculating an average of the time between occurrences in the second cache. Additionally, any other calculation may be performed to quantify an occurrence rate of the occurrences of the second event stored in the second cache.

At block 450, processing logic determines, based on the first estimated rate of occurrence of the first event and the second estimated rate of occurrence of the second event, whether the occurrence of the first event and the occurrence of the second event have a common cause. In some embodiments, determining whether the occurrence of the first event and the occurrence of the second event have a common cause is further based on a proximity in time of the first event to the second event. For example, a closer proximity of occurrence has a lower probability and thus a higher likelihood of common cause. In some embodiments, processing logic may calculate a probability of the first event and the second event occurring with the proximity in time based on the estimated rate of occurrence of the first event and the estimated rate of occurrence of the second event and determine whether the probability is below a threshold probability. The processing logic may then determine, in response to determining that the probability is below the threshold probability, that the occurrence of the first event and the occurrence of the second event have a common cause.

Figure 5:
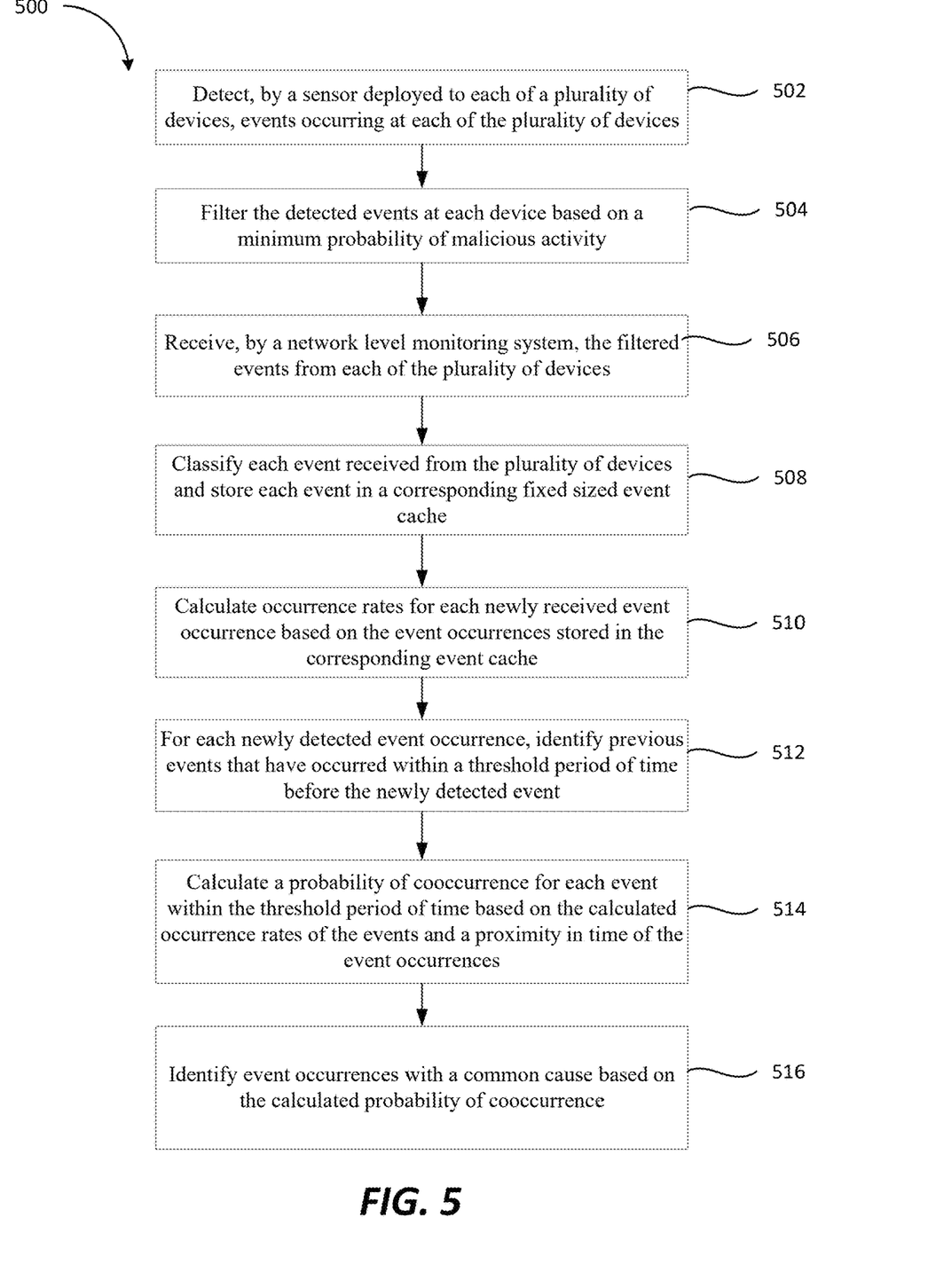
FIG. 5 is a flow diagram of an example method of probabilistic linking of event occurrences across a network, in accordance with some embodiments of the present disclosure.

FIG. 5 is a flow diagram of a method 500 of probabilistic linking of event occurrences across a network, in accordance with some embodiments of the present disclosure. Method 500 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by cybersecurity cloud platform 102, sensors 134A-B, or probabilistic linking component 115 of FIGS. 1-2.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

With reference to FIG. 5, method 500 begins at block 502, where processing logic detects, by a sensor deployed to each of a plurality of devices of a network, events occurring at each of the plurality of devices. In some embodiments, the sensor may be deployed to an operating system of each device or a subset of devices in a network. The sensor may detect potentially malicious events. For example, the sensor may log the occurrence of an event in response to detection of a particular indicator, such as an indicator of compromise, based on rules for event detection. The rules for event detection may include the identification of communications, processes, port accesses, IP address detections, any other potential trigger of an event within a computing system that can be identified, or any combination of triggers.

At block 504, processing logic filters the detected events at each device based on a minimum probability of malicious activity. In some embodiments, each event detection (e.g., occurrence) may be associated with a likelihood or probability that the detection is malicious. For example, some IOCs may be inherently more likely to indicate malicious activity. Processing logic may therefore assign an initial probability that the detection event is malicious. If the initial probability of the detection event or occurrent satisfies (e.g., meets or exceeds) the minimum probability of malicious activity, the processing logic may provide the event occurrence to a network level monitoring system and filter out the occurrences that have probabilities below the minimum probability. In some embodiments, the initial probability may further be based on the occurrence rate of the detected event (e.g., the likelihood that the event should occur at the device). For example, if the occurrence rate of an event is low, the event is more anomalous and the probability of malicious activity is higher.

At block 506, processing logic receives, by a network level monitoring system, the filtered events from each of the plurality of devices. For example, the network level monitoring system may collect events from across the network to identify threats to the entire network and to determine event patterns at the network level (e.g., from multiple devices on the network) that would otherwise be undetectable at the device level. The network level, as referred to herein, may be any system or network level above the device level, such as a local area network, wide area network, corporate network, cloud network, etc.

At block 508, processing logic classifies each event received from the plurality of devices and stores each event in a corresponding fixed sized event cache. In some embodiments, each event occurrence (e.g., type or classification of event) may have a corresponding event occurrence cache to store the most recent occurrences of the event. In some embodiments, the events may be previously classified by the sensor at the device level (e.g., based on the triggered IOC). Accordingly, processing logic may identify the classification and store the occurrence in the corresponding event cache. In some embodiments, the fixed size of each event cache may the same across all events (e.g., store the same number of event occurrences). In other embodiments, the fixed size of each event cache may differ based on various factors associated with the event. For example, the cache size may depend on the occurrence rate for the event, the amount of data associated with event, the initial probability of malicious activity associated with the event, or any combination thereof. Each event cache may store information associated with each event occurrence stored in the cache, such as the type and probability of malicious activity, a timestamp, the device from which the event was received, and so forth, or any combination thereof.

At block 510, processing logic calculates occurrence rates for each newly received event newly received event occurrence based on the event occurrences stored in the corresponding event cache. For example, for each event, processing logic may retrieve the occurrences stored in the cache and calculate an occurrence rate for the event. In some embodiments, processing logic may retrieve all of the occurrences stored in the cache, including the newest received event to calculate the occurrence rate. In other embodiments, for each event, processing logic may retrieve a previously calculated occurrence rate and calculate an updated occurrence rate based on the previous occurrent rate and the newest received event occurrence.

At block 512, processing logic identifies, for each newly detected event occurrence, previous events that have occurred within a threshold period of time before the newly detected event. In some embodiments, processing logic may calculate the threshold period of time for a newly detected event occurrence based on the corresponding occurrence rate of the event. Alternatively, the threshold period of time may be a statically defined threshold. As described herein, newly detected events may be the most recent events received from the sensors deployed to devices in the network and that have not yet been fully processed to determine linking probabilities.

At block 514, processing logic calculates a probability of cooccurrence for each event within the threshold period of time based on the calculated occurrence rates of the events and a proximity in time of the event occurrences. Various methods, formulas, or algorithms may be used to calculate the probability of cooccurrence of events. In some embodiments, processing logic may calculate the probability of cooccurrence of two events based on any combination of the occurrence rate of both events and the proximity in time between the two event occurrences.

At block 516, processing logic identifies event occurrences with a common cause based on the calculated probability of cooccurrence. For example, processing logic may determine that a common cause is associated with two or more events if their probability of cooccurrence is below a threshold probability. Processing logic may further provide an indication or notification of the identification of a common cause, thus allowing further investigation of the cause.

Figure 6:
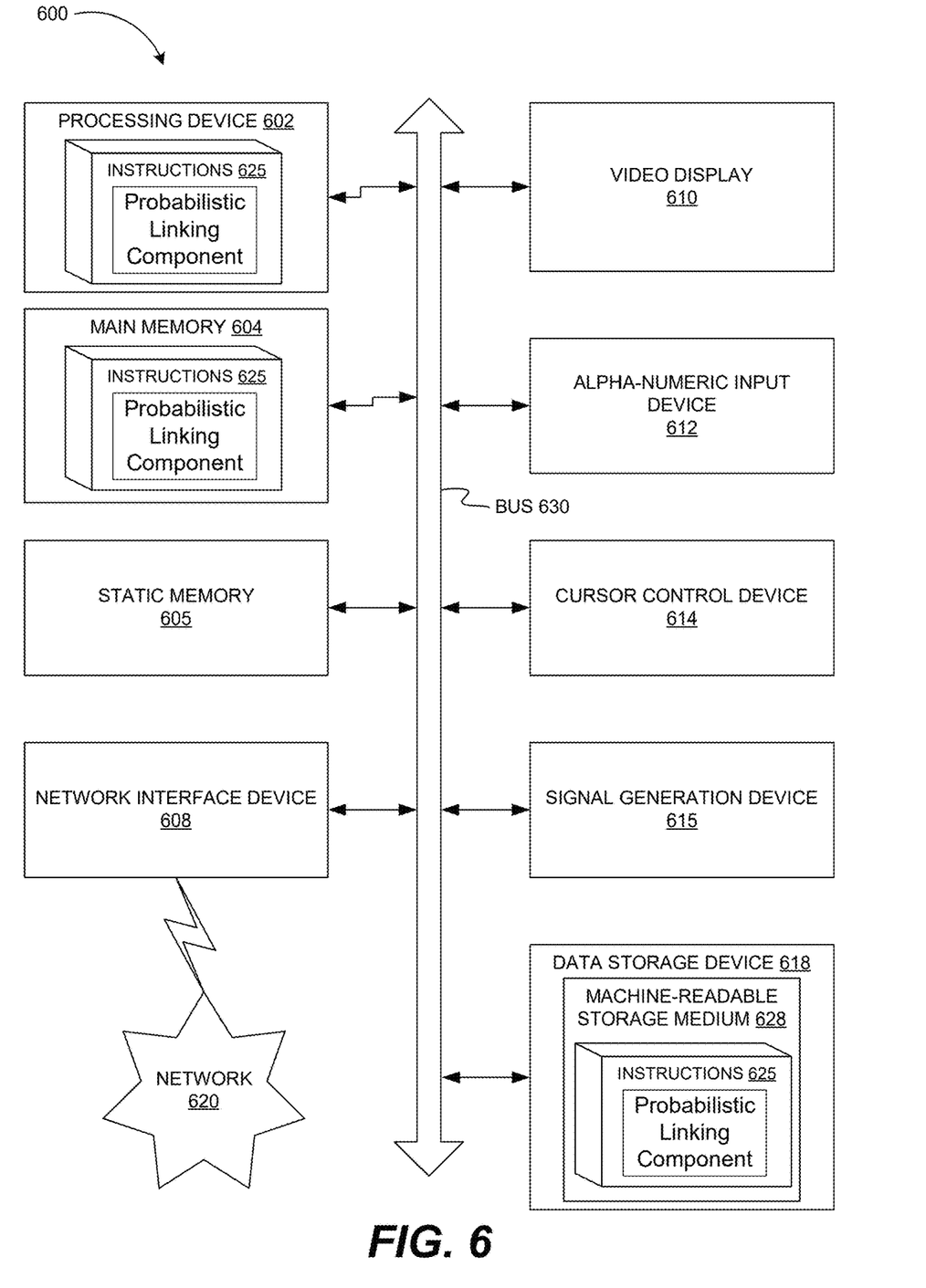
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, computer system 600 may be representative of a server.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618 which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computer system 600 may further include a network interface device 608 which may communicate with a network 620. Computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In some embodiments, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute endpoint monitoring system, for performing the operations and steps discussed herein.

The data storage device 618 may include a machine-readable storage medium 628, on which is stored one or more sets of probabilistic linking component instructions 625 (e.g., software) embodying any one or more of the methodologies of functions described herein. The endpoint monitoring system may also reside, completely or at least partially, within the main memory 604 or within the processing device 602 during execution thereof by the computer system 600; the main memory 604 and the processing device 602 also constituting machine-readable storage media. The endpoint monitoring system may further be transmitted or received over a network 620 via the network interface device 608.

The machine-readable storage medium 628 may also be used to store instructions to perform a method for intelligently scheduling containers, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "deploying," "monitoring," "analyzing," "determining" or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112(f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:
receiving an indication of an occurrence of a first event in a computing environment;
calculating a first estimated rate of occurrence of the first event based on a first cache associated with the first event, wherein calculating the first estimated rate of occurrence comprises calculating a weighted average of time between occurrences of the first event stored in the first cache;
identifying an occurrence of a second event within a threshold amount of time prior to the occurrence of the first event, wherein the threshold amount of time is determined based on the first estimated rate of occurrence of the first event;
calculating a second estimated rate of occurrence of the second event based on a second cache associated with the second event; and
determining, by a processing device, whether the occurrence of the first event and the occurrence of the second event have a common cause based on the first estimated rate of occurrence of the first event and the second estimated rate of occurrence of the second event.

2. The method of claim 1, wherein the first cache comprises a first fixed size to store a fixed number of occurrences of the first event and the second cache comprises a second fixed size to store a fixed number of occurrences of the second event.

3. The method of claim 1, wherein calculating the second estimated rate of the second event comprises calculating a weighted average of the time between occurrences of the second event stored in the second cache.

4. The method of claim 1, wherein determining whether the occurrence of the first event and the occurrence of the second event have a common cause is further based on a proximity in time of the first event to the second event.

5. The method of claim 4, wherein determining whether the occurrence of the first event and the occurrence of the second event have a common cause comprises:
calculating a probability of the first event and the second event occurring with the proximity in time based on the first estimated rate of occurrence of the first event and the second estimated rate of occurrence of the second event;
determining whether the probability is below a threshold probability; and
in response to determining that the probability is below the threshold probability, determining that the occurrence of the first event and the occurrence of the second event have a common cause.

6. A system comprising:
a memory; and
a processing device, operatively coupled to the memory, to:
receive an indication of an occurrence of a first event in a computing environment;
calculate a first estimated rate of occurrence of the first event based on a first cache associated with the first event, wherein to calculate the first estimated rate of occurrence, the processing device is to calculate a weighted average of time between occurrences of the first event stored in the first cache;
identify an occurrence of a second event within a threshold amount of time prior to the occurrence of the first event, wherein the threshold amount of time is determined based on the first estimated rate of occurrence of the first event;
calculate a second estimated rate of occurrence of the second event based on a second cache associated with the second event; and
determine, based on the first estimated rate of occurrence of the first event and the second estimated rate of occurrence of the second event, whether the occurrence of the first event and the occurrence of the second event have a common cause.

7. The system of claim 6, wherein the first cache comprises a first fixed size to store a fixed number of occurrences of the first event and the second cache comprises a second fixed size to store a fixed number of occurrences of the second event.

8. The system of claim 6, wherein to calculate the second estimated rate of the second event, the processing device is to calculate a weighted average of the time between occurrences of the second event stored in the second cache.

9. The system of claim 6, wherein to determine whether the occurrence of the first event and the occurrence of the second event have a common cause is further based on a proximity in time of the first event to the second event.

10. The system of claim 9, wherein to determine whether the occurrence of the first event and the occurrence of the second event have a common cause, the processing device is to:
calculate a probability of the first event and the second event occurring with the proximity in time based on the first estimated rate of occurrence of the first event and the second estimated rate of occurrence of the second event;
determine whether the probability is below a threshold probability; and
in response to determining that the probability is below the threshold probability, determine that the occurrence of the first event and the occurrence of the second event have a common cause.

11. A non-transitory computer readable medium having instructions encoded thereon that, when executed by a processing device, cause the processing device to:
receive an indication of an occurrence of a first event in a computing environment;
calculate a first estimated rate of occurrence of the first event based on a first cache associated with the first event, wherein to calculate the first estimated rate of occurrence, the processing device is to calculate a weighted average of time between occurrences of the first event stored in the first cache;
identify an occurrence of a second event within a threshold amount of time prior to the occurrence of the first event, wherein the threshold amount of time is determined based on the first estimated rate of occurrence of the first event;
calculate a second estimated rate of occurrence of the second event based on a second cache associated with the second event; and
determine, by the processing device, whether the occurrence of the first event and the occurrence of the second event have a common cause based on the first estimated rate of occurrence of the first event and the second estimated rate of occurrence of the second event.

12. The non-transitory computer readable medium of claim 11, wherein the first cache comprises a first fixed size to store a fixed number of occurrences of the first event and the second cache comprises a second fixed size to store a fixed number of occurrences of the second event.

13. The non-transitory computer readable medium of claim 11, wherein to calculate the second estimated rate of the second event, the processing device is to calculate a weighted average of the time between occurrences of the second event stored in the second cache.

14. The non-transitory computer readable medium of claim 11, wherein to determine whether the occurrence of the first event and the occurrence of the second event have a common cause, the processing device is to:
- calculate a probability of the first event and the second event occurring with a determined proximity in time based on the first estimated rate of occurrence of the first event and the second estimated rate of occurrence of the second event;
- determine whether the probability is below a threshold probability; and
- in response to determining that the probability is below the threshold probability, determine that the occurrence of the first event and the occurrence of the second event have a common cause.

* * * * *